Sept. 22, 1925.    E. H. MAGOON    1,554,865
DEVICE FOR TREATING SOIL
Filed March 28, 1923
Fig. 1,
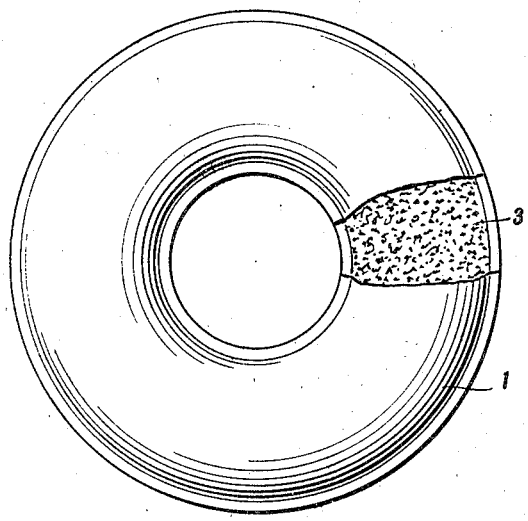
Fig. 2,
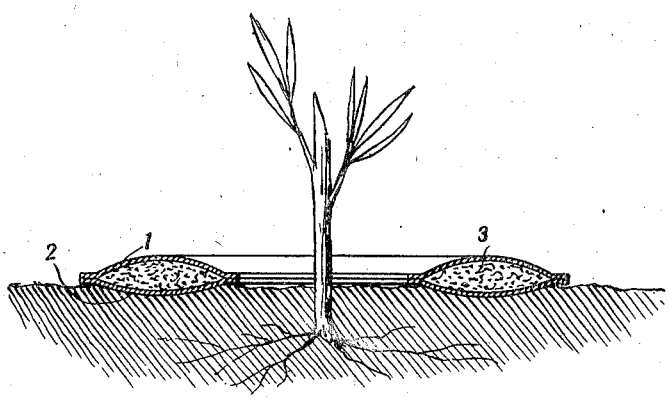
Fig. 3.
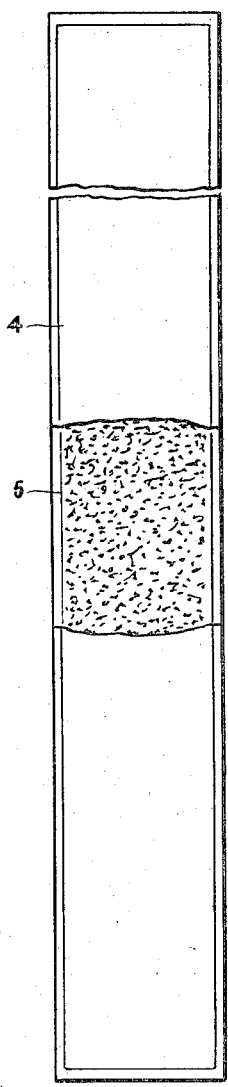
WITNESSES
Edw. Thorpe
Robert D. Hulsizer
INVENTOR
Eaton H. Magoon
BY
ATTORNEYS Patented Sept. 22, 1925.

1,554,865

UNITED STATES PATENT OFFICE.

EATON HARRY MAGOON, OF HONOLULU, TERRITORY OF HAWAII.

DEVICE FOR TREATING SOIL.

Application filed March 28, 1923. Serial No. 628,347.

*To all whom it may concern:*

Be it known that I, EATON H. MAGOON, a citizen of the United States, and a resident of Honolulu, Territory of Hawaii, have invented a new and Improved Device for Treating Soil, of which the following is a full, clear, and exact description.

The invention relates to a device for treating soil. Heretofore in the arts, and with relation to certain crops, it has been customary to place on the ground in the immediate vicinity, and preferably around the plant pushing its way upward out of the ground, a covering of material, preferably paper, so that the ground in the immediate vicinity of the plant is protected from the sunlight and will, therefore, not grow weeds. This paper has been called "mulch paper". In its use it, of course, after being placed on the ground, will gradually deteriorate and disintegrate but not until after such time as the plants have grown sufficiently to be sturdy and capable of growing substantially unaffected by the growth of weeds in their immediate neighborhood.

It is an object of my invention to associate with this well known mulch paper, or other material to be placed in proximity with the ground in the neighborhood of plants, a composition which when it is permitted to get into the ground will affect its condition or quality. This composition may be a fertilizing agent or some other chemical intended to stimulate or affect the condition or quality of the ground for one purpose or another. These ingredients may be held between layers of paper, as desired. One of the many ideas, however, is to so associate the soil-treating ingredients with the paper that these may be sold together, and when placed on the ground for one purpose or another will gradually release the soil-treating ingredients as the paper deteriorates or disintegrates.

The invention is illustrated in the drawings, of which—

Figure 1 is a plan view, with a part broken away, of one form of my invention;

Fig. 2 is a section taken through the device showing it in association with the ground and a plant; and Fig. 3 is a plan view, partly broken away, of a modified form of the invention.

The forms of the invention shown in the drawings are preferred forms, although it is understood that modifications in the construction and arrangement of the parts and in the character of the materials used may be adopted without departing from the spirit of the invention.

In a great many agricultural industries, for example in the Hawaiian Islands where various sugar factories and pineapple plantations are in operation, it has been found useful to use mulch paper for the protection of the plants. The ground is first prepared and the paper is then placed on the ground and the plants, such as pineapple plants, are planted in the holes in the paper. In the planting of sugar cane, the cane is planted and then the paper is laid over the top. The chief purpose of this paper or covering is to keep all weeds from the plants until they are practically grown in order to eliminate the great amount of labor used in the cultivation of fields.

For this purpose I may provide, as shown in Figs. 1 and 2, two sheets of paper, such as 1 and 2, annular in shape, sewed or otherwise connected at their adjacent edges to form a hollow ring within which a suitable mass or body of soil-treating ingredients 3 may be contained. By providing this device in the form of a hollow ring I am able easily to dispose the ring closely around the plant, permitting it to grow uninterruptedly but yet covering the ground in the immediate proximity thereto. I also can provide a container or receptacle for the soil-treating ingredients, which may be any one of those above mentioned, such as fertilizer.

On the other hand, if I desire to cover the ground between the rows of plants, I can use long bands or strips of material, such as that represented in Fig. 3 by the numeral 4, which may be formed of a pair of sheets of material sewed together along their edges, containing soil-treating ingredients 5.

As far as my invention is concerned, it matters not what the ingredients are. They may be any chemical elements or compounds which are beneficial to the soil or of some particular value when used in connection with the soil for agriculture purposes.

What I claim is:—

A device for treating soil, which comprises two superimposed layers of material fastened together only along their edges to form a chamber to contain fertilizer, and a mass of fertilizing material loosely contained within said chamber.

EATON HARRY MAGOON.